US006985224B2

(12) United States Patent
Hart

(10) Patent No.: US 6,985,224 B2
(45) Date of Patent: Jan. 10, 2006

(54) LIGHT EMITTING DIODE (LED) ARRAY FOR EXCITATION EMISSION MATRIX (EEM) FLUORESCENCE SPECTROSCOPY

(75) Inventor: Sean J. Hart, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 281 days.

(21) Appl. No.: 10/387,776

(22) Filed: Mar. 14, 2003

(65) Prior Publication Data

US 2004/0179196 A1 Sep. 16, 2004

(51) Int. Cl.
G01J 3/30 (2006.01)
(52) U.S. Cl. .................. 356/317; 250/459.1; 250/461.2
(58) Field of Classification Search ................ 356/317, 356/318, 326, 432; 600/473–476; 250/459.1, 250/461.2
See application file for complete search history.

(56) References Cited

U.S. PATENT DOCUMENTS

| 5,830,134 A | * | 11/1998 | Caputo et al. ............... 600/322 |
| 6,069,689 A | * | 5/2000 | Zeng et al. .................... 356/73 |
| 6,373,568 B1 | * | 4/2002 | Miller et al. ................ 356/326 |
| 6,571,118 B1 | * | 5/2003 | Utzinger et al. ............ 600/476 |
| 6,834,237 B2 | * | 12/2004 | Noergaard et al. ............ 702/19 |
| 2004/0064053 A1 | * | 4/2004 | Chang et al. ................ 600/478 |
| 2004/0178370 A1 | * | 9/2004 | Oldham et al. .......... 250/559.4 |

OTHER PUBLICATIONS

Hart et al, "Light emitting diode excitation emission matrix fluorescence spectroscopy," Analyst, 2002, 127, 1693-1699.*

Hershberger et al., "Liquid Chromatography with Real-Time Video Fluorometric Monitoring of Effluents," Anal. Chem., 1981, 53, 971.
Skoropinski et al., "Laser Videoflurometer System for Real-Time Characterization of High-Performance Liquid Chromatographic Eluate," Anal. Chem., 1986, 58, 2831.
Jalkian et al., "HPLC Determination of Polycyclic Aromatic Compounds by Fluorescence Detected with a Charge-Coupled Device," Proc. SPIE vol. 1054, 1989, 1054, 91.
Booksh et al., "Theory of Analytical Chemistry," Anal. Chem., 1994, vol. 66, A782.
Baker, "Fluorescence Excitation—Emission Matrix Characterization of River Waters Impacted by a Tissue Mill Effluent," Environ. Sci. Technol., 2002, vol. 36, No. 7, 1377.

(Continued)

Primary Examiner—Layla G. Lauchman
(74) Attorney, Agent, or Firm—John J. Karasek; Thomas D. Robbins

(57) ABSTRACT

This invention discloses an Excitation Emission Matrix (EEM) fluorescence spectrometer system that uses an LED array to cause excitation emission matrix fluorescence that is imaged onto a spectrograph for sample identification and analysis. By using the LED array, the spectrograph requires only high spectroscopic resolution of about 1 to 5 nm in the fluorescence emission range and low excitation light resolution of about 14 to 73 nm in the excitation range. While individual LED optical excitation spectra may contain wavelength regions that overlap, as long as the various LEDs have different excitation wavelengths and intensities, spectral overlap does not preclude data analysis. The invention provides an EEM spectroscopy system that is not a high resolution such as a laser or lamp based excitation system, but instead uses a lower resolution, lower power LED system. The invention also provides results that are comparable to existing systems with lower component cost and lower power requirements while also optically stable, small, and easy to use.

20 Claims, 6 Drawing Sheets

OTHER PUBLICATIONS

Del Castillo et al., "Analysis of the optical properties of the Orinoco River plume by absorption and fluorescence spectroscopy," Mar. Chem., 1999, 66, 35.

Moberg et al., "Spectrofluorimetric determination of chlorophylls and pheopigments using parallel factor analysis," Talanta, 2001, 54, 161.

R. Henrion et al., "Three-way Principal Components Analysis for fluorescence spectroscopic classification of algae species," Fresenius' J. Anal. Chem., 1997, 357, 522.

G. Albrecht-Buehler, "Autofluorescence of Live Purple Bacteria in the Near Infrared," Exp. Cell Res., 1996, 236, 43.

Smart et al., "Evaluation of Some Fluorescent Dyes for Water Tracing," Water Resour. Res., 1977, 13(1), Abstract.

R. G. Lyons, "Identification and separation of water tracing dyes using pH response characteristics," J. Hydrol., 1993, 152(1-4), 13.

F. Ricchelli et al., "Porphyrins as fluorescent probes for monitoring phase transitions of lipid domains in biological . . . ", J. Photochem. Photobiol. B, 1995, 29(1), 65.

Aiken et al., "Characterisitic Visible Fluorescence Emission Spectra of Sera from Cancer Patients," Anal. Lett., 1994, 27(3), 511.

Bowers et al., "Quantitative determination of porphyrins in rat and human urine and evaluation of urinary porphyrin . . . ", J. Lab. Clin. Med., 1992, 120(2), Abstract.

Ng et al., "Porphyrin profiles in blood and urine as a biomarker for exposure to various arsenic species," Cell. Mol. Biol., 2002, 48(1), Abstract.

Henegariu et al., "Custom fluorescent-nucleotide synthesis as an alternative method for nucleic acid labeling," Biotechnol., 2000, 18 (3), 345-348.

Fauth et al., "Classifying by colors: FISH-based genome analysis," Cytogenet. Cell Genet., 2001, 93 (1-2), Abstract.

Speel, "Detection and amplification systems for sensitive, multiple-target DNA and RNA in situ . . . ," Histochem. Cell Biol., 1999, 112 (2), Abstract.

Szuhai et al., "Simultaneous Molecular Karyotyping and Mapping of Viral DNA Integration Sites by 25-Color COBRA-FISH," Gene. Chromosom. Canc. 2000, 28 (1), 92-97.

Bro, "PARAFAC. Tutorial and Applications," Chemometr. Intell. Lab., 1997, 38, 149.

Warner et al., "Quantitative Analyses of Multicomponent Fluorescence Data by the Methods of Least Squares and . . . ," Anal Chem 49, (1977) 2155-2159.

Lorber, "Quantifying Chemical Composition From Two-Dimensional Data Arrays," Analytica Chimica Acta (1984) 164: 293-297.

Sanchez et al., "Generalized Rank Annihilation Factor Analysis," Anal Chem (1986) 58: 496-499.

Klonis et al., "Effect of Sovent-Water Mixtures on the Prototropic Equilibria of Fluorescein and on the Spectral Properties . . . ," Phochem. Photobiol., 2000, 72(2), 179.

Muroski et al., "Single-Measurement Excitation/Emission Matrix Spectrofluorometer for Determination . . . ," Anal. Chem. 1996, 68, 3534-3538.

Booksh et al., "Single-Measurement Excitation/Emission Matrix Spectroflurometer for Determination . . . ," Anal. Chem. 1996, 68, 3539-3544.

Lohmannsroben et al., "Combination of laser-induced fluorescence and diffuse-reflectance spectroscopy of the . . . ," Applied Optics, vol. 38, No. 9, Mar. 20, 1999, 1404-1410.

Jiji et al., "Mitigation of Raleigh and Raman Spectral Interferences in Multiway Calibration of Excitation . . . ," Anal. Chem. 2000, 72, 718-725.

Hart et al., "Field Demonstartion of a Multichannel Fiber-Optic Laser-Induces Fluorescence System in a . . . ," Field Analytical Chemistry and Technology, 1(6): 343-355, 1997.

Hart et al., "A Fiber Optic Multichannel Laser Spectrometer System for Remote Fluorescence Detection," SPIE vol. 2835/73-82, 1996.

Hart et al., "A Laser-Induced Fluorescence Dual-Fiber Optic Array Detector Applied to the Rapid HPLC Separtion of Polycyclic . . . ," Anal Bioanal Chem (2002) 372: 205-215.

Burns et al., "Rank Annihilation with Incomplete Information," Anal. Chem., 1986, 58, 2805-2811.

\* cited by examiner

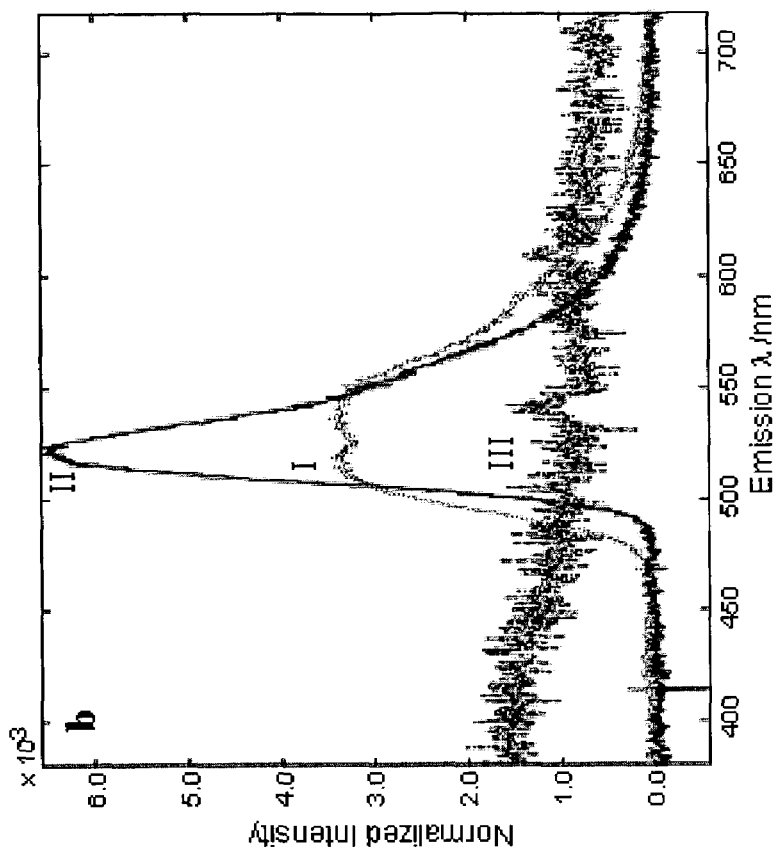
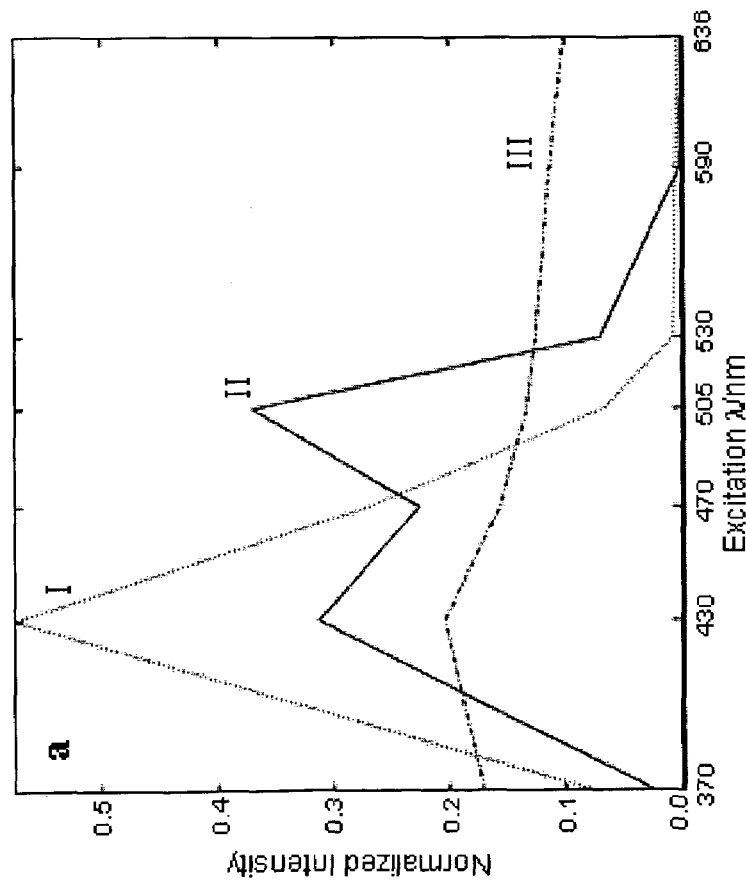
Figure 6a
Figure 6b

LIGHT EMITTING DIODE (LED) ARRAY FOR EXCITATION EMISSION MATRIX (EEM) FLUORESCENCE SPECTROSCOPY

BACKGROUND OF THE INVENTION

1. Field of the Invention

The invention is concerned with single measurement Excitation Emission Matrix (EEM) spectroscopy using an array of light emitting diodes (LED). The array of LEDs is focused into a sample cuvette, creating spacially separated excitation spots.

2. Description of the Related Prior Art

Fluorescence excitation emission matrix (EEM) spectroscopy has long been known as a powerful method for complex mixture analysis. (See Hershberger, L. W.; Callis, J. B.; Christian, G. D.; Anal. Chem., 1981, 53, 971–975; Skoropinski, B.; Callis, J. B.; Danielson, J. D. S.; Christian G. D.; 1986, Anal. Chem., 58, 2831–2839; and Jalkian, R.; Denton, B.; Proc. SPIE 1989, 1054, 91–102.)

The ability to easily collect full emission spectra for several excitation wavelengths, has generally required expensive and complex instrumentation. The multi-way characteristics of EEM data enable the extraction of the salient chemical features. As a consequence, mathematical resolution of analytes is possible, even in the presence of unknown interferences, which is known as the second-order advantage. (See Booksh, K. S.; Kowalski, B. R.; Anal. Chem., 1994, 66, A782–A791.)

The full range of molecules and dyes which fluoresce under long wavelength UV (370 nm) through near infra-red (NIR) wavelength (980 nm) excitation can be used with this inexpensive and simple to construct EEM system. The potential applications of upper UV, visible, and NIR fluorescence include fluorescence of dyes, larger PAHs (anthracene, chrysene, benzopyrene, perylene, etc.), humic materials, (See Baker, A.; Environ. Sci. Tech., 2002, 36, 7, 1377–1382; and Del Castillo, C. E.; Coble, P .G.; Morell, J. M.; Lopez, J. M.; Corredor, J. E.; Mar. Chem., 1999, 66, 35–51.) chlorophylls from plants (See Moberg, L.; Robertsson, G.; Karlberg, B.; Talanta, 2001, 54, 161–170.) and algae (See Henrion, R.; Henrion, G.; Bobme, M.; Behrendt, H.; Fresen. J. Anal. Chem., 1997, 357, 522–526.) and NIR fluorescence from bacteriochlorophyll[i] (See Albrecht-Buehler, G.; Exp. Cell Res., 1996, 236, 43–50) in certain bacteria. Other applications include environmental dye tracers (See. Smart, P. L.; Laidlaw, I. M. S.; Water Resour. Res., 1977, 13 (1), 15–33; and Lyons, R. G.; J. Hydrol., 1993, 152 (1–4), 13–29) and porphyrin fluorescence. (See Ricchelli. F.; Gobbo, S.; J. Photochem. Photobiol. B, 1995, 29 (1), 65–70.) Fluorescence of porphyrins and derivatives can be used for detection of certain cancers using patient sera analysis (See Aiken, J. H.; Huie, C. W.; Terzian, J. A.; Anal. Lett., 1994,27(3), 511–521.), and as markers for heavy metal poisoning through urine analysis. (See Bowers, M. A.; Aicher, L. D.; Davis, H. A.; Woods, J. S.; J. Lab. Clin. Med., 1992, 120 (2), 272–281; and Ng, J. C.; Qi, L. X.; Moore, M. R.; Cell. Mol. Biol., 2002, 48 (1), 111–123.)

The application of LED array excitation is well suited to fluorescence in situ hybridization (FISH) of cell and bacterial suspensions. The true advantage, in this arena, with the LED-EEM system is for multiplexed fluorescence in-situ hybridization (M-FISH) (See Henegariu, O.; Bray-Ward, P.; Ward, D. C.; Nat. Biotechnol., 2000, 18 (3), 345–348.), where many dyes (5–10) are used to simultaneously detect various cell or bacterial types using specific oligo-nucleotides. Furthermore, the possibility of multiplexing FISH-based genome analysis is very attractive. (See Fauth, C.; Speicher, M. R.; Cytogenet. Cell Genet., 2001, 93 (1–2), 1–10; Speel, E. J. M.; Histochem. Cell Biol., 1999, 112 (2), 89–113; and Szuhai, K.; Bezrookove, V.; Wiegant, J.; Vrolijk, J.; Dirks, R. W. Rosenberg, C.; Raap, A. K.; Tanke, H. J.; Gene. Chromosom. Canc., 2000, 28 (1), 92–97.) The availability of full emission spectra at multiple excitation wavelengths will allow better characterization of FISH dyes. This can be achieved using readily available fluorophores, without resorting to expensive designer dyes which absorb maximally at a common wavelength (typically 488 nm—argon ion laser) and emit in well separated regions for simplified detection. Future advances in LED technology may result in lower UV wavelengths being made available, thus extending the range of applications.

SUMMARY OF THE INVENTION

An object of this invention is to provide an Excitation Emission Matrix (EEM) fluorescence spectrometer system for resolving and identifying a wide variety of components and closely related chemical species.

Another object of this invention is to use a light emitting diode (LED) light source array in order to provide the emission matrix fluorescence excititation needed for EEM spectroscopy.

Another object of this invention is to provide an Excitation Emission Matrix (EEM) fluorescence spectrometer system which requires only high spectroscopic resolution of about 1 to 5 nm in the fluorescence emission range and low resolution of about 14 to 73 nm in the excitation range.

Another object of this invention is to provide an EEM fluorescence spectrometer system in which the LEDs have different excitation wavelengths as well as intensities and spectral overlap does not preclude data analysis.

Another object of this invention is to provide low spectroscopic resolution optical excitation elements (LED) used for the analysis of complex chemical samples when several are combined and used in concert for excitation emission matrix spectroscopy.

Another object of the invention is to provide a combination of partially selective instrumental elements (LEDs) whose results are comparable to other EEM systems.

Another object of the invention is to provide an LED array EEM spectroscopic system whose results are comparable to existing systems yet with lower component cost and lower power requirements while also optically stable, small, and easy to use.

Another object of the invention is to provide a EEM spectroscopy system that does not require a high resolution excitation system such as a laser or lamp, but instead uses a lower resolution, lower power LED system.

BRIEF DESCRIPTION OF THE DRAWINGS

FIG. 6a is a PARAFAC model of fluorescein in ethanol using 3 factors: for resolved excitation spectra I =fluorescein monoanion factor: II =fluorescein dianion factor; and III =instrumental background factor.

FIG. 6b is a PARAFAC model of fluorescein in ethanol using 3 factors: for resolved emission spectra I =fluorescein monoanion factor; II =fluorescein dianion factor; and III =instrumental background factor.

DESCRIPTION OF THE PREFERRED EMBODIMENT

Figure 1:
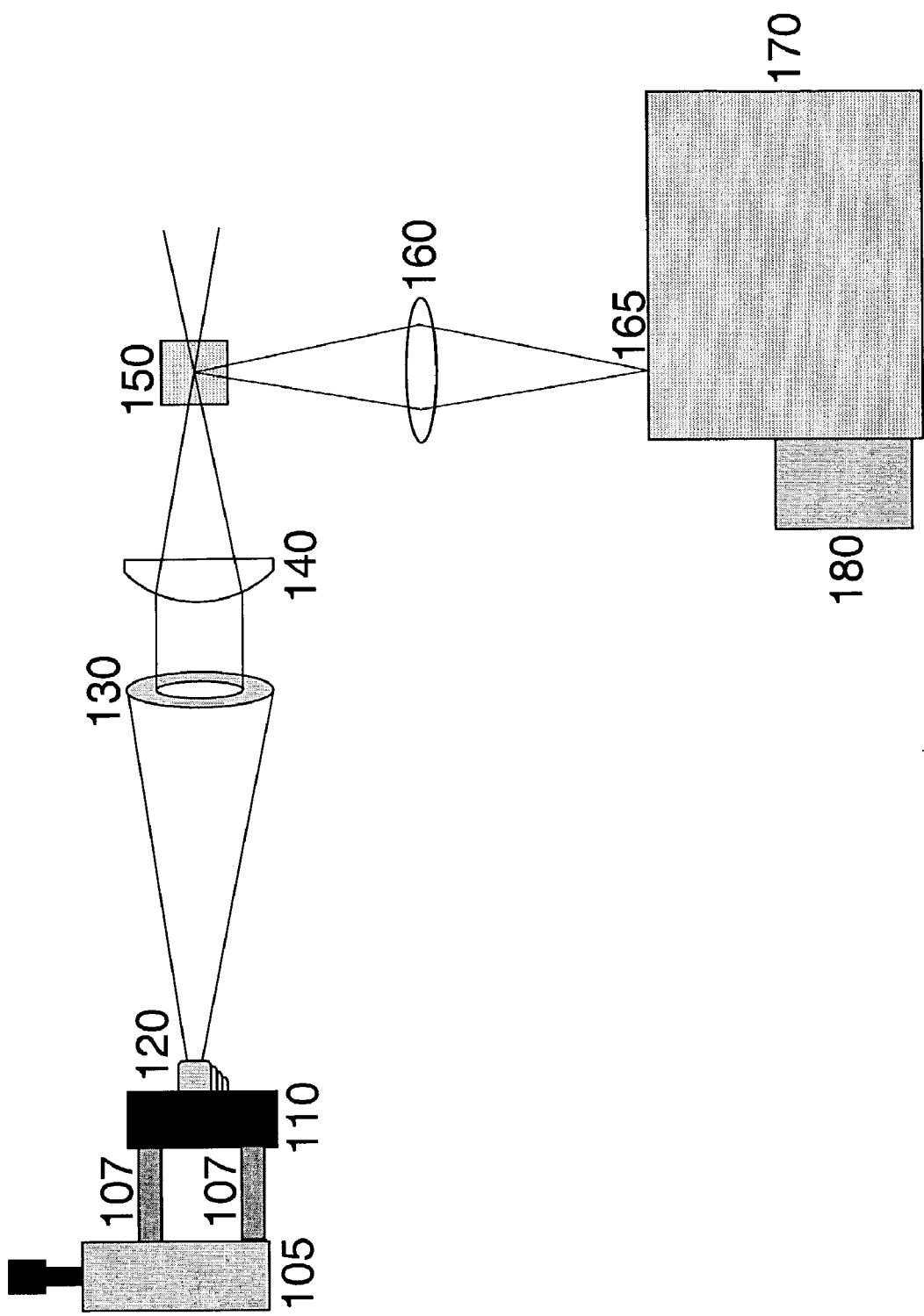
FIG. 1 is a block diagram showing the system of the invention.

This invention represents a new instrument for single measurement EEM spectroscopy which is based upon an array of light emitting diodes (LED). The array of LEDs is focused into a sample cuvette, creating spatially separated excitation spots. LED-induced fluorescence from analytes in solution is collected at right angles and delivered to the entrance of a spectrograph with a CCD camera for detection. The broad emission spectrum of LEDs permits continuous coverage over a large excitation range with a limited number of LEDs, allowing excitation of all analytes with absorption within the LED's excitation range. Each analyte may be uniquely excited by each LED, thereby conserving the multi-way characteristics of the data common to all EEM methods. In this regard, LED-EEM spectroscopy can be viewed from a sensors standpoint: multiple partially selective instrumental elements. These individual components, when combined, provide a more complete spectroscopic picture of the chemical puzzle. The success of LED-EEM spectroscopy extends the possibilities: it is not always necessary to have high excitation wavelength resolution. In fact, the instrument performs well even with overlap of the excitation wavelength regions. Mathematically, unique excitation information (differing amounts of emission at each excitation channel) are generated for even heavily overlapped excitation ranges. This instrument was designed for the single measurement collection of multi-dimensional fluorescence data. Multi-dimensional fluorescence excitation emission matrix (EEM) data, emission spectra measured at multiple excitation wavelengths, provide the analyst with a wealth of analytical information. The additional information makes possible the qualitative and quantitative analysis of complex mixtures. Furthermore, using LEDs permits the construction of a simplified instrument, without significant compromises to the analytical information required for analysis of complex samples. A variety of samples can be measured using the LED wavelengths currently available: upper UV through visible and NIR: 350 nm to 980 nm.

Theory

In traditional EEM spectroscopy, the excitation resolution is often quite high; there is no redundancy in the excitation wavelengths from channel to channel. In contrast, excitation wavelength regions can overlap when using LEDs, due to their broad wavelength ranges. This is especially true when trying to maximize excitation spectral coverage. The theoretical basis for LED-EEM fluorescence spectroscopy is based upon the variation in both the LED optical output function (generally an approximately Gaussian intensity distribution) and the molar absorptivity ($\epsilon$) over the excitation wavelengths of the LED. The fluorescence intensities at any given emission wavelength (FL) due to LED A and LED B for a single analyte are given by Equations 4 and 5, $$FL_{LEDA} \propto \sum_{\lambda=1}^{\Lambda} I_{LEDA\lambda} \epsilon_\lambda \qquad (4)$$

$$FL_{LEDB} \propto \sum_{\lambda=1}^{\Lambda} I_{LEDB\lambda} \epsilon_\lambda \qquad (5)$$

where $\epsilon_\lambda I_{LEDA\lambda}$, and $I_{LEDB\lambda}$ represent the molar absorptivities and LED intensities at the LED excitation wavelengths, $\lambda=1$ to $\Lambda$, respectively. The wavelength range, 1 to $\Lambda$ is given by the wavelength distributions of LED A and LED B. The fluorescence emission spectra recorded on two LED channels A and B will be linearly independent so long as the molar absorptivities are different at the LED excitation wavelengths with regard to experimental noise. The excitation overlap in LED-EEM spectroscopy need only be reduced as required to resolve analytes of interest. As we will show, even closely related analytes are distinguishable using a general purpose LED array which included some spectrally overlapped excitation wavelengths. A more specific selection of LEDs can be used to better resolve a particular sample. This is analogous to moving or selecting a different grating in an excitation spectrograph.

Application

The novel light source used in this instrument will allow a cost-effective EEM instrument to be produced. The cost of the traditional excitation source used in single measurement EEM spectroscopy, a lamp and spectrograph, is prohibitive: generally more than $10,000. The LED excitation array is very cost effective and so an instrument can now easily and inexpensively be developed and marketed to utilize the multi-way advantages offered by EEM spectroscopy. Future advances in LED technology may result in lower UV wavelengths being made available, thus extending the range of applications.

FIG. 1 is a block diagram of the LED array instrument as used for fluorescence excitation emission matrix (EEM) spectroscopy. This diagram also includes the light pathway through the system culminating in a focused spot at the spectrograph entrance slit (165). In reference to FIG. 1, the LED array (120) consists of seven individual LEDs of varying peak output wavelengths: 370 nm, 430 nm, 470 nm, 505 nm, 525 nm, 590 nm and 636 nm. The LEDs are arranged linearly and wired to be illuminated by a DC voltage between 1.9 V and 3.8 V. A summary of the LED specifications used to construct the array is given in Table 1. The array was attached to a linear translating stage (105) using two optical posts (107). This allowed precise positioning of the array image, within the cuvette (150), and thus on the imaging spectrograph (170) (257i, Oriel, Stratford, Conn.) entrance plane (165) and charge coupled device (CCD) (180) (Instaspec V, Oriel, Stratford, Conn.). Although many types of commercial spectrographs and CCD cameras could be used to demonstrate LED EEM spectroscopy, these models were chosen for their performance characteristics.

TABLE 1

LED Array Electrical and Optical Specifications

| Nominal LED λ (nm) | Actual LED λ (nm) | Bandpass FWHM[a] (nm) | Viewing Angle (degrees) | Forward Voltage (V) | Optical Power (μW)[b] |
|---|---|---|---|---|---|
| 370 | 379.4 | 15 | 10 | 3.83 | 759 |
| 430 | 434 | 73 | 15 | 3.55 | 223 |
| 470 | 473.6 | 22 | 15 | 2.84 | 78 |
| 505 | 514.5 | 47 | 15 | 2.97 | 108 |
| 530 | 533.2 | 32 | 15 | 2.40 | 56 |
| 590 | 593 | 14 | 8 | 1.95 | 236 |
| 636 | 633.5 | 17 | 8 | 1.85 | 533 |

[a]FWHM—full width half maximum
[b]Measured at the LED

Light emitted from the LED array (120) is passed through adjustable iris (130) set at a 40 mm opening to limit off axis rays and stray light. The LED array image is focused into the liquid sample using a 50 mm diameter, 50 mm focal length lens (140) placed 430 mm from the LED array. This distance results in an appropriate demagnification of the LED array image. The resulting reduction in the size allowed the image to enter the quartz sample cuvette (1 cm×1 cm×5 cm) (150) and generate fluorescence from an appropriate solution. The sample is placed in a quartz fluorescence cuvette (150), which is held in a metal cuvette holder. LED light entering the cuvette (150) may generate fluorescence at each LED spot according to which sample is being interrogated. A 25 mm diameter, 50 mm focal length lens (160) is used to collect fluorescence at right angles to the LED excitation spots and image the fluorescence onto the entrance image plane of the spectrograph. The fluorescence collection lens (160) was 190 mm from the sample cuvette. This distance also resulted in a reduction in the size of the LED array image which was imaged through the spectrograph slit (165).

In FIG. 1, the detection system 170 and 180 consisted of a ¼ m imaging spectrograph 170 fitted with a removable 50 μm fixed slit and a 300 line/mm grating blazed at 500 nm resulting in a 1 nm emission bandpass. Mounted at the exit pane was a 1024×256 pixel CCD camera (180) cooled to −55° C. The integration time used throughout this work was 60 s, unless otherwise noted, and the dark current was subtracted in real time by the acquisition software. The CCD was binned by 10 pixels in the vertical direction, defining each excitation channel. Binning was chosen by observing the LED scattering spots measured by the CCD and selecting the ten best pixels to collect data from each excitation spot. Seven 10 pixel sections, corresponding to each LED, of the CCD image were hardware binned in the vertical dimension producing 7×1024 LED-EEMs.

Figure 2:
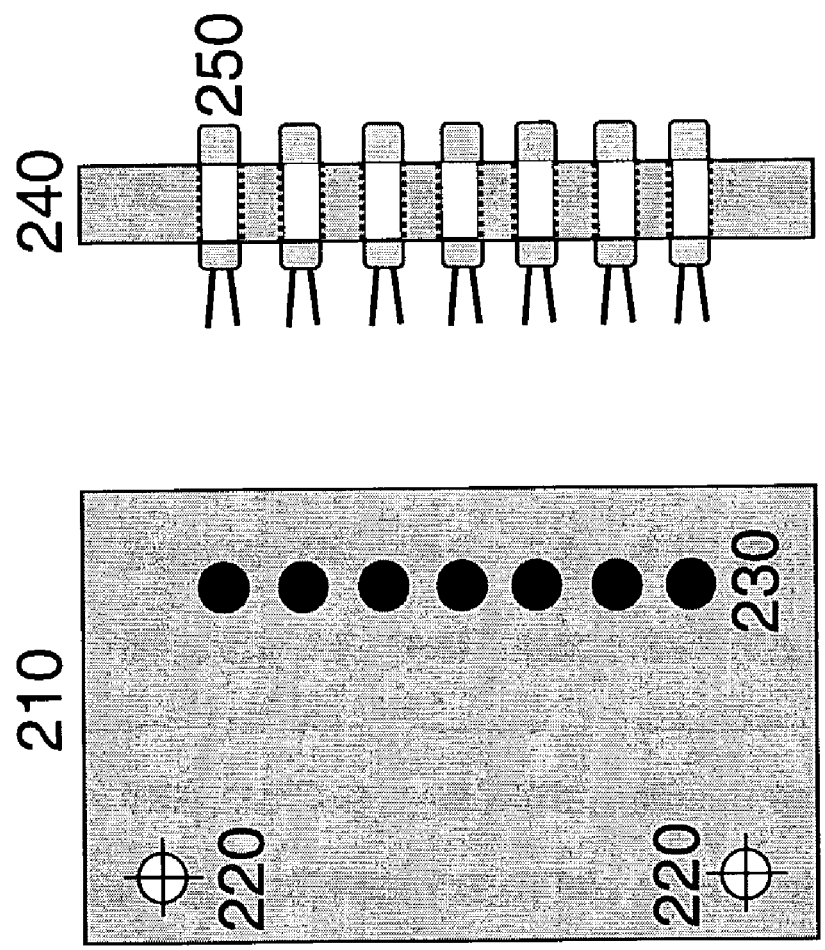
FIG. 2 is a block diagram showing the mounting device for holding and aligning the LED emission source array.

FIG. 2 depicts the mounting system for the LED array. In reference to FIG. 2, the 5 mm diameter LEDs were mounted and epoxied into holes (230) which had been drilled out of an aluminum plate (210) to accommodate each LED. The plate (210) had additional holes (220) to mount the plate to a vertical translator using optical posts (107). In FIG. 2, a side view (240) of the mounting plate (210) is shown. The seven LEDs (250) are spaced evenly at approximately 7 mm center to center, which resulted in a 57 mm long linear array, from the top LED to the bottom LED. The LEDs were not all driven at the optimum voltages; the system was optimized with respect to the blue excitation spectrum due to the lower excitation intensities of those LEDs. The incident excitation powers, at the sample, were between 0.4% and 5% of the total optical power measured at the LED. These losses were worse in off-axis positions due to aberrations and vignetting. The excitation bandpass of the LED system is unconventional and must be considered on a per channel basis. For our system the minimum bandpass was 14 nm and the maximum was 73 nm. The wavelength output distribution of the LED defines the bandpass for that channel.

Figure 3:
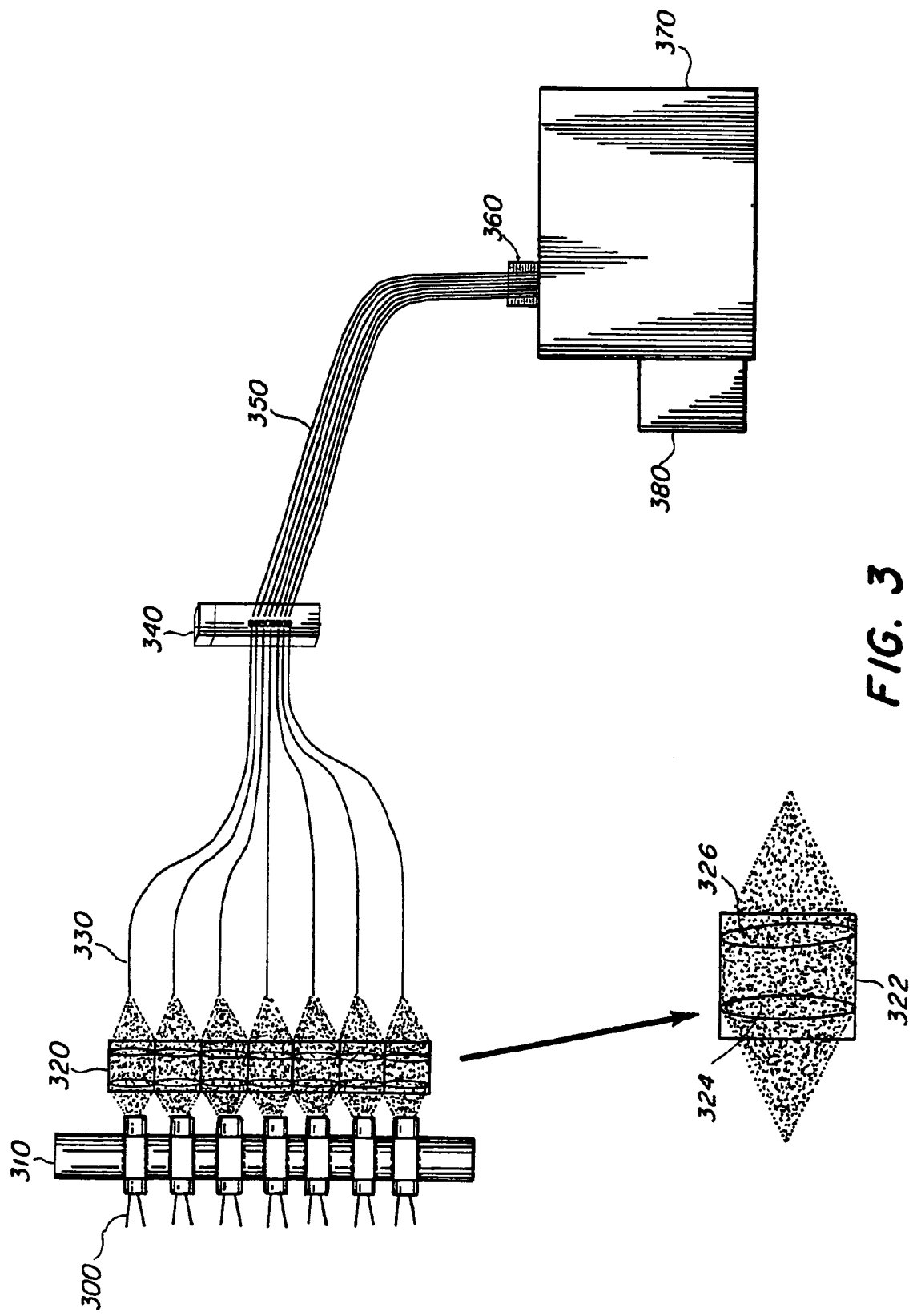
FIG. 3 is a diagram of an implementation of an instrument for LED EEM spectroscopy using optical fibers.

The general concept of employing broad wavelength LED excitation sources resulting in low resolution excitation dimension EEM data could be implemented in a variety of fashions in addition to the lens based version described above. An alternative implementation of the invention that uses optical fiber rather than a lens to reduce the size of the array image is shown in FIG. 3. In this implementation, the optical outputs (320) of the LED (300) in the mounting plate (310) are collimated and then refocused into individual optical fibers (330). The collimation and refocusing are accomplished using simple two lens systems (322) comprised of a collimating (324) and focusing lens (326) for each LED. The optical fibers are then brought together at separation distances (≈0.5 mm) sufficient to prevent distal cone overlap in the solution (340). A second array of fibers (350) is used to collect fluorescence emission and deliver it to the entrance plane (360) of the spectrometer.

In order to understand the performance of the LED array system, the optical output of each LED must be known in terms of both total power (Table 1) and wavelength distribution. The wavelength distribution will define the range and types of molecules which can be measured with a selected set of LEDs. Furthermore, the LEDs must be chosen so that each wavelength range contains at least some unique excitation wavelengths. The broad emission spectrum of LEDs permits continuous coverage over a large excitation range with a limited number of LEDs, allowing excitation of all analytes with absorption within the LED's excitation range. From a sensors standpoint, the LED array can be viewed as a collection of partially selective instrumental elements. These individual components, when combined, provide a more complete spectroscopic picture of the chemical puzzle.

Figure 4:
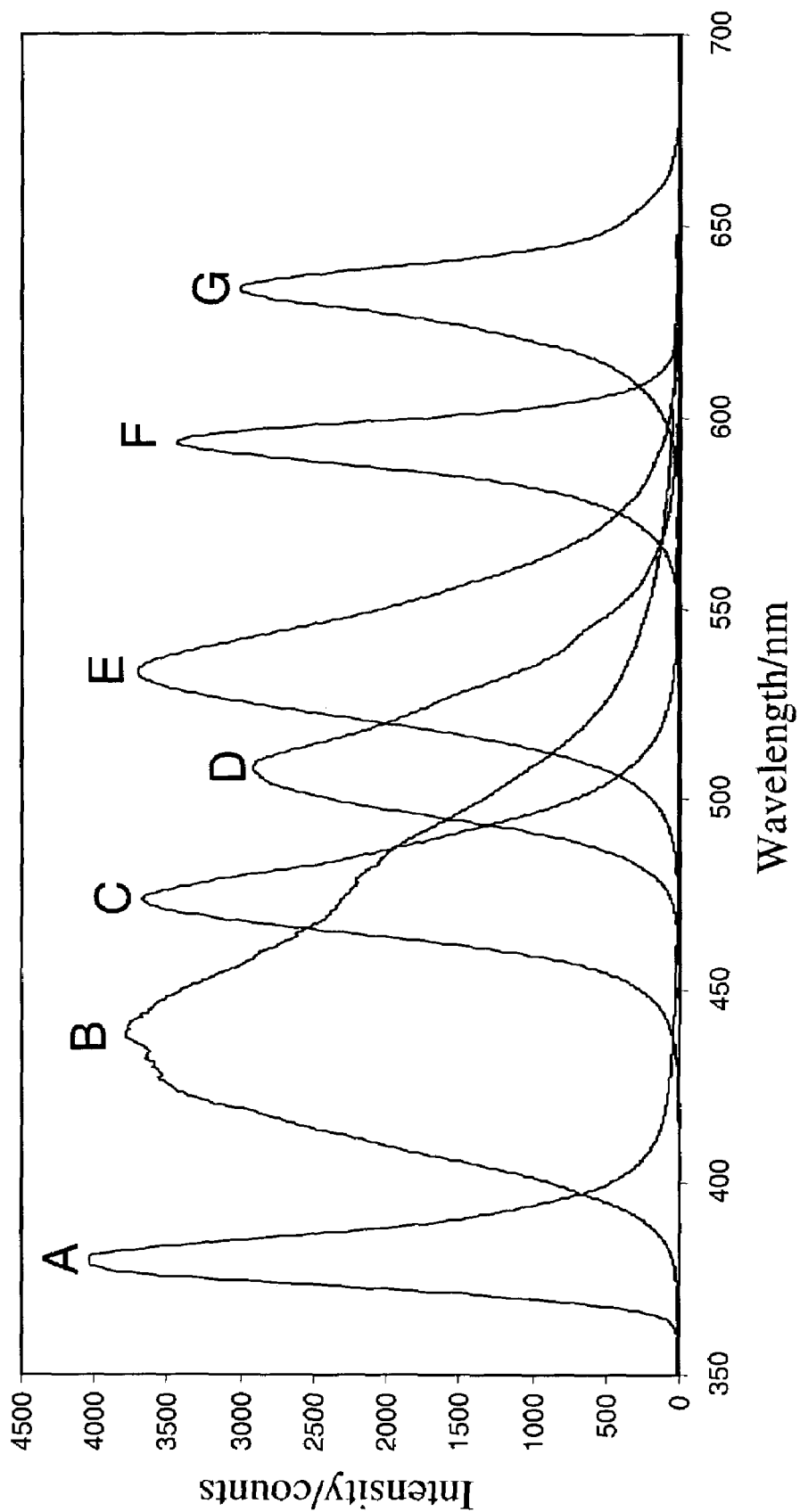
FIG. 4 is the LED output intensities as a function of wavelength, a) 370 nm, b) 430 nm, c) 470 nm, d) 505 nm, e) 530 nm, f) 590 nm, and g) 636 nm.

FIG. 4 contains the optical output of each LED as a function of wavelength, measured using a commercial miniature spectrometer (S2000, Ocean Optics, Dunedin, Fla.). This miniature spectrometer was used solely for the purpose of instrument development and is not part of the invention described herein. Different LEDs of the same nominal wavelength, from the same manufacturer, had peak wavelengths which varied by less than 1%. Considering the large wavelength range of each LED, these represent relatively minor wavelength variations. LEDs with varying wavelengths were chosen, but complete wavelength separation was not a requirement. This can be seen in FIG. 4 with significant spectral overlap between curves B and C, curves B and D, curves C and D, and finally curves D and E.

Figure 5:
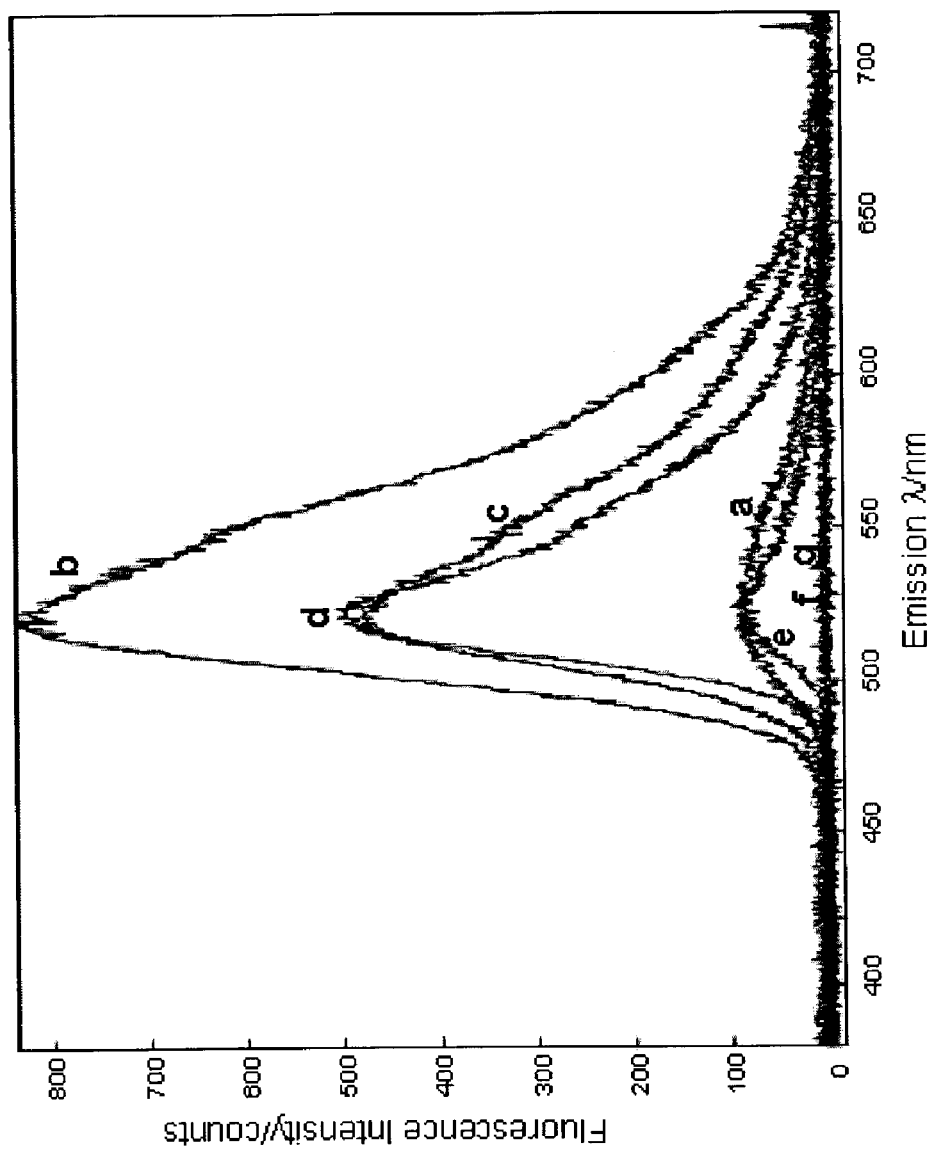
FIG. 5 is Fluorescence spectra of 100 ppb fluorescein in ethanol collected simultaneously at LED wavelengths a) 370 nm, b) 430 nm, c) 470 nm, d) 505 um, e) 530 um, f) 590 um, and g) 636 um.

FIG. 5 shows the raw spectroscopic output of the LED array instrument invention. Referring to FIG. 5, the fluorescence of 200 ppb fluorescein in ethanol at the LED excitation wavelengths is shown in FIG. 5a–5g. As can be seen, there is variation in the emission peaks as a function of excitation wavelength indicating the presence of more than one component. The fluorescence spectrum is broader at lower excitation wavelengths with a maximum at 520 nm and shoulder around 550 nm. At higher excitation wavelengths the shoulder disappears resulting a single maximum at 520 nm.

Upon data processing using the well known technique, parallel factor analysis (PARAFAC) (See R. Bro, Chemometr. Intell. Lab., 1997, 38, 149), using three factors, the emission of both anionic forms of fluorescein were resolvable as given in FIGS. 6a 6b. FIGS. 6a and 6b show the results of data processing with spectroscopic output collected using the invention. There are many multidimensional data processing algorithms which may be employed for analysis of EEM data. These include least squares (See G. D. Christian, E. R. Davidson, and I. M. Warner (1977) Anal Chem 19: 2152–2159), rank annihilation factor analysis (RAFA) (See A. Lorber, Analytica Chimica Acta (1984) 164: 293–297), and the generalized rank annihilation method (GRAM) (See Sanchez E, Kowalski BR (1986) Anal Chem 58: 498–499). PARAFAC was chosen for its flexibility and capability for the analysis of complex mixtures. It is clear from the resolved components that two distinct species are fluorescing. In FIG. 6a, the monoanion (I) was maximally excited at 430 nm versus the maximum excitation of the dianion (II) at 505 nm. Similarly, in FIG. 6b, the emission maximum for the dianion (II) was 520 nm versus two maxima for the monoanion (I) at 515 nm and 535 nm. The third factor, while somewhat elevated, is dominated by noise and describes the instrumental background. These two forms of fluorescein have been observed (by spectral subtraction) and studied in the literature; the spectra obtained using the invention are in agreement with the published data (See Klonis and Sawyer, Photochem. Photobiol., 2000, 72 (2), 179). It is well known that only the dianion form of fluorescein is present in basic solutions. A 200 ppb solution of fluorescein in basic ethanol showed the emission spectra were independent of excitation wavelength, confirming that the two factors represent two fluorescent forms of fluorescein present in neutral environments. The contributions of the mono- and dianion forms of fluorescein were resolved apriori, as they cannot be obtained individually and exist in solution only. This example demonstrates the power of the LED-EEM system combined with PARAFAC analysis because the highly overlapped fluorescence spectra were resolvable. This led to the visualization of components (anionic forms of fluorescein) at neutral pH which have not been measurable before this invention.

To further characterize and test the instrument, two to six component mixtures of dyes in ethanol were measured and analyzed. The ability of the system to resolve a wide variety of components and closely related species is well demonstrated using these two to six component samples. The dyes were chosen to illustrate the range of molecules detectable using an LED array EEM instrument, but also to show the ability to resolve overlapping spectra. The full emission wavelength range was filled with analyte emission, and several components were significantly overlapped: rhodamine B and fluorescein, and 9,10-bis(phenylethynyl)-anthracene and fluorescein. However, the slight differences in the LED-excitation and emission spectra allow resolution and quantitation of both rhodamine B and safranin O. The effect of the broad LED wavelength range can be seen in the resolved excitation profiles of the six components. The excitation spectra of the dyes are weighted with respect to the LEDs with the broadest excitation ranges (470 nm, 73 nm FWHM and 505 nm, 47 nm FWHM).

The data of merit for the analysis of both the single component standards and multi-component mixtures are listed in Table 2. Table 2 lists the results of data analysis of the spectroscopic output collected using the invention. The PARAFAC resolved concentration profiles were used to build the calibration curves for the quantitative analysis described in Table 2. The total fluorescein concentration should be proportional

TABLE 2

Figures of Merit for Quantitation of the Dye Standards and Unknowns

| Analyte | Concentration Range (ppb) | Sensitivity (counts/ppb) | LOD (ppb) | RMSEC[a] (ppb) | RMSEP[b] (ppb) | $r^2$ |
|---|---|---|---|---|---|---|
| Diphenyl anthracene | 62.5–500.0 | 1.25E+02 | 3.68 | 0.30 | 1.67 | 0.999 |
| 9,10-bis(phenylethynyl) anthracene | 12.5–100.0 | 2.13E+03 | 0.53 | 0.10 | 0.18 | 0.996 |
| Fluorescein (monoanion) | 25.0–200.0 | 1.21E+03 | 1.57 | 0.30 | 3.99 | 0.991 |
| Rhodamine B | 12.5–100.0 | 2.80E+03 | 0.76 | 0.23 | 0.60 | 0.980 |
| Safranin O | 50.0–400.0 | 1.18E+03 | 2.53 | 0.39 | 1.30 | 0.996 |
| Nile Red | 25.0–200.0 | 2.16E+03 | 0.72 | 0.20 | 2.13 | 0.996 |

[a]root mean squared error of calibration,
[b]root mean squared error of prediction to both the monoanion and dianion tautomers. However, fluorescein was quantified using only the predicted fluorescence of the monoanion due to the better linearity and sensitivity for this species. The root mean squared error of calibration (RMSEC) and correlation coefficient ($r^2$) show that the instrument is capable of precise calibration with root mean squared error of prediction (RMSEC) better than 4 ppb and $r^2$ values greater than 0.98. The LOD were less than 4 ppb with the best cases being in the mid ppt range. The quantitative capabilities of the instrument are good, as given by the RMSEP. The RMSEP were less than 4 ppb for all analytes and were in the sub ppb range for 9,10-bis(phenylethynyl)-anthracene and rhodamine B.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. An excitation emission fluorescence system for use in sample identification, said system comprising:
   a light source array comprising a plurality of light sources, wherein each light source is arranged and operable to emit light to a unique portion of the sample, respectively, and to excite emission fluorescence from the respective unique portion of the sample such that a wavelength band of the excited emission fluorescence from the unique portion of the sample partially overlaps a wavelength band of an excited emission fluorescence from at least one other portion of the sample, and
   wherein at least two light sources of said plurality of light sources are operable to emit different wavelengths of light.

2. The excitation emission fluorescence system of claim 1, further comprising a transmission system positioned to transmit light from said light source array onto the sample.

3. The excitation emission fluorescence system of claim 2, wherein said transmission system comprises an optical fiber system.

4. The excitation emission fluorescence system of claim 1, further comprising a transmission system positioned to transmit light from the sample onto a spectrograph.

5. The excitation emission fluorescence system of claim 4, wherein said transmission system comprises an optical fiber system.

6. The excitation emission fluorescence system of claim 1, further comprising a spectrograph arranged and operable to receive the emission fluorescence from the plurality of portions of the sample and operable to provide an output based on the emission fluorescence,
wherein said spectrograph has a high excitation light resolution of about 1 to 5 nm in a emission fluorescence range of the sample and a low excitation light resolution of about 14 to 73 nm in the emission fluorescence range of the sample.

7. The excitation emission fluorescence system of claim 1, further comprising a detector arranged to detect the emission fluorescence from the plurality of portions of the sample.

8. The excitation emission fluorescence system of claim 7, further comprising an output device operable to provide an output based on the emission fluorescence detected by said detector.

9. An excitation emission fluorescence system for use in sample identification, said system comprising:
an LED array comprising a plurality of LEDs,
wherein each LED is arranged and operable to emit light to a unique portion of the sample, respectively, and to excite emission fluorescence from the respective unique portion of the sample, and
wherein at least two LEDs of said plurality of LEDs are operable to emit different wavelengths of light.

10. The excitation emission fluorescence system of claim 9, wherein each of said plurality of LEDs is operable to emit light having a wavelength that is different than the wavelength of light emitted by the remaining LEDs.

11. The excitation emission fluorescence system of claim 10, wherein said plurality of LEDs are operable to emit wavelengths varying from about 350 nm to about 980 nm.

12. A method of identifying a sample via excitation emission fluorescence, said method comprising:
arranging a light source array, comprising a plurality of light sources, to emit light to the sample; and
illuminating a plurality of unique portions of the sample, via the light emitted from the plurality of light sources, respectively, to excite emission fluorescence from the respective unique portions of the sample such that a wavelength band of the excited emission fluorescence from a unique portion of the sample partially overlaps a wavelength band of an excited emission fluorescence from at least one other portion of the sample.

13. The method of claim 12, further comprising transmitting, via a transmission system, light from the light source array onto the sample.

14. The method of claim 13, wherein said transmitting comprises transmitting, via an optical fiber system, light from the light source array onto the sample.

15. The method of claim 12, further comprising:
receiving, via a spectrograph, the emission fluorescence from the unique portions of the sample; and
providing an output based on the emission fluorescence for sample identification.

16. The method of claim 15, further comprising transmitting, via a lens, light from the sample onto the spectrograph.

17. The method of claim 15, further comprising transmitting, via an optical fiber system, light from the sample onto the spectrograph.

18. A method of identifying a sample via excitation emission fluorescence, said method comprising:
arranging an LED array, comprising a plurality of LEDs, to emit light to the sample; and
illuminating a plurality of unique portions of the sample, via light emitted from the plurality of LEDs, respectively, to excite emission fluorescence from the respective unique portions of the sample,
wherein at least two LEDs of the plurality of LEDs emit light having different wavelengths.

19. The method of claim 18, wherein each of the plurality of LEDs is operable to emit light having a wavelength that is different than the wavelength of light emitted by the remaining LEDs.

20. The method of claim 18, wherein said illuminating comprises illuminating via light emitted from the plurality of LEDs in wavelengths varying from about 350 nm to about 980 nm.

* * * * *